United States Patent [19]

Goto et al.

[11] Patent Number: 4,963,517
[45] Date of Patent: Oct. 16, 1990

[54] SINTERED CERAMIC BODY WITH EXCELLENT REFRACTORIES (HEAT RESISTANCE) AND MACHINABILITY AND METHOD OF MANUFACTURE OF THE SAME

[75] Inventors: Kazumasa Goto; Hiroto Shin; Hideki Ishida; Yasuo Goto; Akira Iwahashi, all of Aichi, Japan

[73] Assignee: Inax Corporation, Aichi, Japan

[21] Appl. No.: 156,612

[22] Filed: Feb. 16, 1988

[51] Int. Cl.$^5$ .............................................. C04B 35/02
[52] U.S. Cl. .................................... 501/122; 501/123; 501/154
[58] Field of Search ........................ 501/122, 123, 154

[56] References Cited

U.S. PATENT DOCUMENTS 3,926,647  12/1975  Wuhrer ................................ 501/122
4,652,534  3/1987   Kasuga ..................................... 501/5

OTHER PUBLICATIONS

57-Ceramics, vol. 35, 1976: p. 279.

Primary Examiner—Mark L. Bell
Assistant Examiner—Deborah Jones
Attorney, Agent, or Firm—Kanesaka and Takeuchi

[57] ABSTRACT

Disclosed is a sintered ceramic body with high strength, excellent refractoriness (heat-resistance) and machinability characterized by comprising a composition of $CaO-SiO_2-MgO$ as surrounded by the points 1, 2, 3, 4, 5, 6 and 7 in FIG. 1.

Also disclosed is a method of manufacturing a sintered ceramic body with excellent refractoriness (heat-resistance) and machinability characterized by preparing a raw material composition which consists of CaO, $SiO_2$ and MgO as surrounded by the points, 1, 2, 3, 4, 5, 6 and 7 in FIG. 1 and then firing the composition at a temperature higher than 1200° C. and up to 1350° C.

7 Claims, 3 Drawing Sheets

FIG. I

SINTERED CERAMIC BODY WITH EXCELLENT REFRACTORIES (HEAT RESISTANCE) AND MACHINABILITY AND METHOD OF MANUFACTURE OF THE SAME

FIELD OF THE INVENTION AND RELATED ART STATEMENT

The present invention relates to a sintered ceramic body with excellent machinability and a method of manufacture of the same, and in particular, to a sintered ceramic body which is excellent in machinability and which may be fired at a high temperature and has an extremely high strength as well as a method of manufacture of the said body.

Since sintered ceramic bodies are, in general, highly hard but brittle, cutting or other machining of the bodies is extremely difficult. For example, among general sintered potteries, hard porcelains are composed of a main crystal phase including mullite ($3Al_2O_3.2SiO_2$), quartz, etc. as bonded by an alkali glass phase. The crystalline raw material is, before being sintered, decomposed under heat and reacted in an eutectic state to become a hard and brittle but poorly tough material having a Mohs' hardness of 7 or more, which is composed of different crystal phase and glass phase. Accordingly, the resulting material has a defect in workability in the point that this is almost impossible to be worked by general carbon steel tools. Alumina or zirconia porcelains and the like which are known as so-called oxide ceramics have sintered bodies of fine crystalline materials and have a high strength, but as these have a Mohs' hardness of 8 or more, these can hardly be worked or machines with with conventional carbon steel tools.

When special tools such as a diamond cutter are used for working such hard materials, these could be cut or machined in some degree. However, the diamond cutter is a high-price tool, and in addition, the machining with this requires a long period of time and a noticeable labor, and therefore, this is not industrially advantageous since the working cost is high.

Under the situation, the provision of sintered ceramic bodies which may be cut, sheared, pierced, grooved or machined, with ease, into any desired forms without cracking or breakage, in the same manner as cutting general woods, by the use of general tools having an edge made of a general carbon steel, for example, drills, saws, cutters, etc., or that is, sintered ceramic bodies having an excellent machinability has been strongly desired.

Hetherto, a mica-glass ceramic of "macor" (trade name by Corning) has been known, which is said to be improved in machinability. It is said that this has somewhat improved machinability. However, since this substantially contains a crystallized glass of $KMg_2AlSi_3O_{10}F_2$ in an amount from 30 to 40%, this could also hardly be machined with general carbon steel tools. Further, this is easily broken and additionally this is softened and deformed at about 800° C. Accordingly, it should be said that this would rather have plural defects as a ceramic product.

Ceramics which are free from the said problems and which are excellent in machinability are illustrated in Japanese Patent Application (OPI) No. 184643/85. (The term "OPI" as used herein means a "published unexamined Japanese patent application".)

However, for the sintered ceramic bodies illustrated in Japanese Patent Application (OPI) No. 184643/85, the firing temperature cannot be high (that is, the ceramics are fired at 1200° C. or lower) for the purpose of preventing the transition of $\beta$-wollastonite to $\alpha$-wollastonite, and so, the sintered ceramic bodies are defective in that the strength thereof is low and these could not be practically used at a temperature of 1000° C. or higher.

OBJECTS AND SUMMARY OF THE INVENTION

The object of the present invention is to overcome the above-mentioned problems in the prior art and to provide sintered ceramic bodies which are excellent in machinability and additionally which can be fired at a high temperature and have an extremely excellent refractoriness (heat-resistance) and an extremely high strength, as well as to provide a method of manufacture of said bodies.

The object can be attained by a sintered ceramic body with excellent refractoriness (heat-resistance) and machinability comprising a composition of $CaO-SiO_2-MgO$ as surrounded by the points 1, 2, 3, 4, 5, 6 and 7 in FIG. 1, as well as by a method of manufacture of a sintered ceramic body with excellent refractoriness (heatresistance) and machinability comprising preparing a raw material composition of $CaO-SiO_2-MgO$ as surrounded by the points 1, 2, 3, 4, 5, 6 and 7 in FIG. 1 and then firing the raw material composition at a temperature higher than 1200° C. and up to 1350° C.

$\beta$-wollastonite ($\beta CaO.SiO_2$) has a needlewise well grown triclinic system texture, which is different from the monoclinic system granular crystal texture of $\alpha$-wollastonite. The $\beta$-wollastonite can yield excellent machinability.

The graph of FIG. 2 apparently indicates that if the $CaO-SiO_2$ system is not fired at a temperature of 1200° C. or lower, especially at 1130° C. or lower or so, $\alpha$-wollastonite would crystallize in the fired product so that the resulting product could not have good machinability. On the contrary, in the system of $CaO-MgO-SiO_2$ formed by adding MgO to the said $CaO-SiO_2$ system, the transition temperature from $\beta$-wollastonite to $\alpha$-wollastonite is elevated so that the composition of the said system can be fired at a higher temperature.

However, if the amount of MgO is too large, the hardness of the sintered body would be too high, or nonneedle crystals would be formed too much, whereby the machinability of the resulting body would often be lowered.

The present inventors earnesly studied for the purpose of obtaining a $CaO-SiO_2-MgO$ system composition which can be fired at a high temperature because of the elevation of the transition temperature from $\beta$-wollastonite to $\alpha$-wollastonite and which may produce a sintered body having high machinability and high strength, and as a result, have found that the composition as surrounded by the points 1, 2, 3, 4, 5, 6 and 7 in FIG. 1 can form a sintered ceramic body having excellent machinability and high strength and therefore have achieved the present invention.

DETAILED DESCRIPTION OF THE PREFERRED EMBODIMENTS

The present invention will be explained in detail hereinafter.

Figure 1:
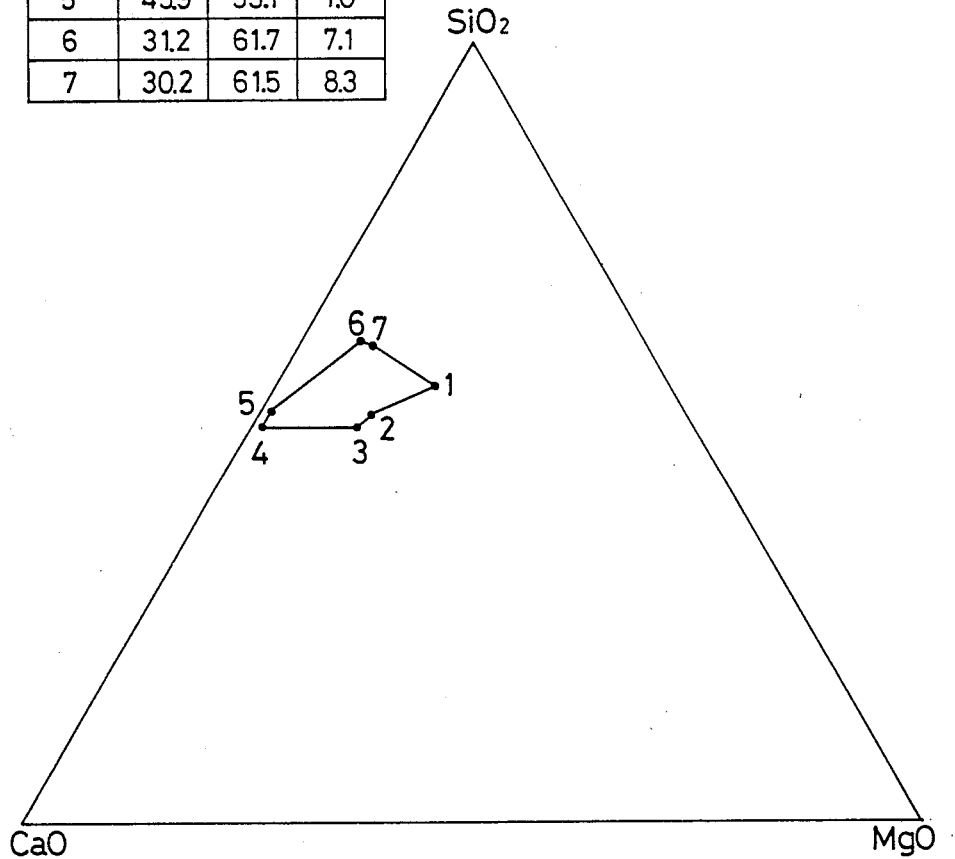
FIG. 1 shows a $CaO-SiO_2-MgO$ three-component diagram.
Figure 2:
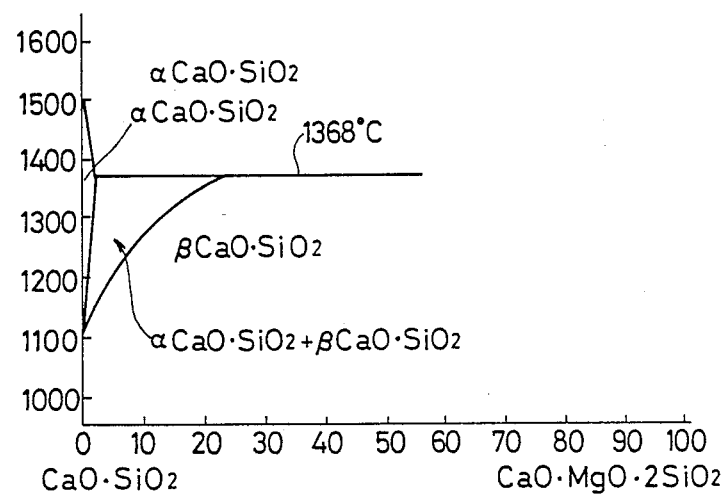
FIG. 2 shows a diagram to explain the relation between $CaO.SiO_2$ system and $CaO.MgO.2SiO_2$ system
Figure 3:
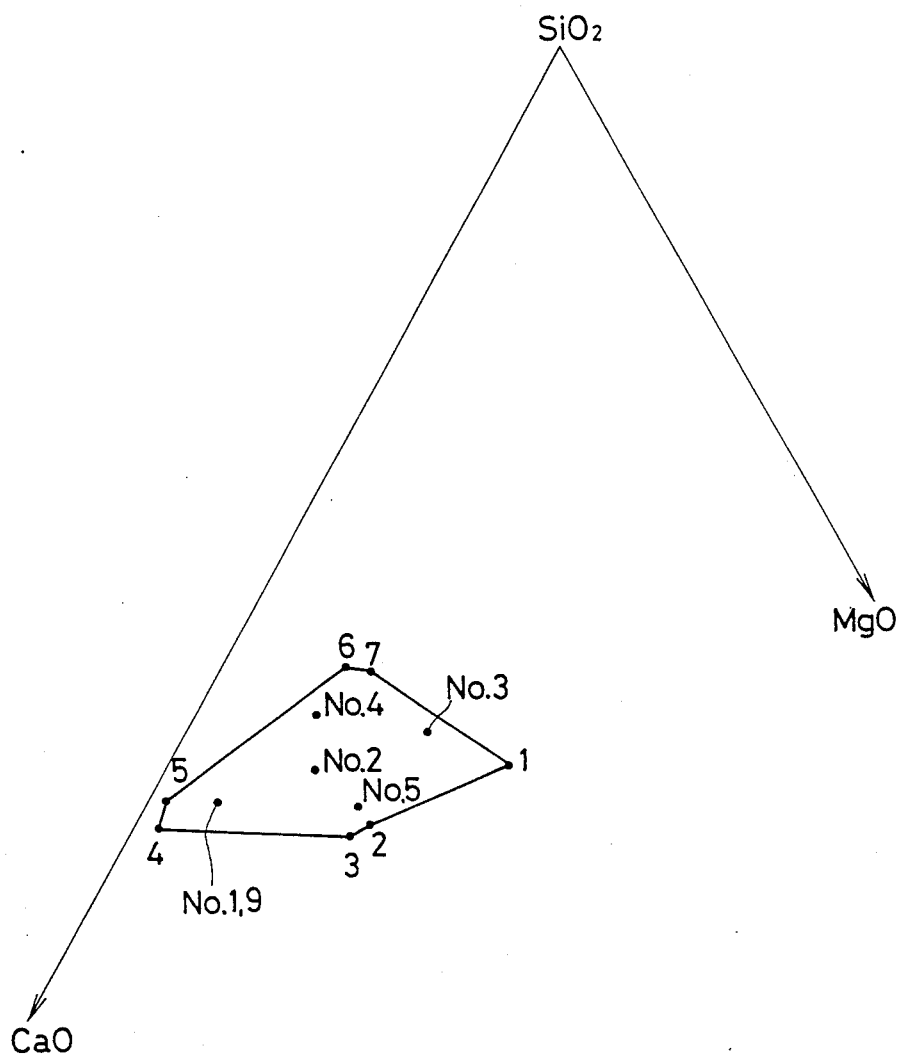
FIG. 3 shows an enlarged part of the CaO-SiO$_2$-MgO three-component diagram containing the compositions of Examples 1 to 5 and 9.

The sintered ceramic body of the present invention has the composition of CaO, SiO$_2$ and MgO as surrounded by the points 1, 2, 3, 4, 5, 6 and 7 in FIG. 1.

In FIG. 1, the respective points from 1 to 7 mean to have the composition as shown in Table 1 below.

TABLE 1

| Point | CaO | SiO$_2$ | MgO (wt. %) |
| --- | --- | --- | --- |
| 1 | 25.7 | 55.5 | 18.8 |
| 2 | 35.4 | 51.6 | 13.0 |
| 3 | 36.5 | 51.3 | 12.2 |
| 4 | 47.4 | 51.6 | 1.0 |
| 5 | 45.9 | 53.1 | 1.0 |
| 6 | 31.2 | 61.7 | 7.1 |
| 7 | 30.2 | 61.5 | 8.3 |

The method of the present invention, which is preferred for the manufacture of the sintered body of the present invention as mentioned above, will be mentioned in detail hereinafter.

In accordance with the method of the present invention, a CaO raw material, a SiO$_2$ raw material and a MgO raw material are first blended so that a composition of CaO, SiO$_2$ and MgO may fall within the range as surrounded by the points of 1, 2, 3, 4, 5, 6 and 7 in FIG. 1

As the CaO raw material and the SiO$_2$ raw material for use in the method of the present invention, natural or synthetic $\beta$CaO.SiO$_2$, such as wollastonite, or calcium silicate hydrate capable of forming wollastonite after fired, such as xonotlite, etc are preferred. Calcium carbonate and silica can also be used. As the MgO, raw material such as talc, dolomite, magnesium hydroxide, magnesium carbonate and magnesium oxide can be used.

These raw materials are well milled and blended in such degree that the needle-like or tabular crystals of the raw materials are not destroyed, and then shaped in a conventional manner and fired at a temperature higher than 1200° C. and up to 1350° C.

In practice of the present invention, a material which may be molten by firing to form a glass phase, such as feldspar, etc., can be incorporated into the raw material composition, whereby the strength of the fired body to be obtained may be improved. As such material, nepheline feldspar is preferably used among the feldspar group. Regarding the amount of the said material, the improvement of the strength of the fired body may be higher with the increase of the amount thereof to be added. However, if the amount is, for example, 15% by weight or more of the amount of the main raw material component of wollastonite, the workability of the fired body to be obtained would noticeably lower, and therefore, the amount to be added is preferably 10% by weight or less of the amount of wollastonite. (If the raw material composition contains a component for forming wollastonite by firing, the said amount is based on the amount of the wollastonite formed by firing.)

For manufacture of a shaped body in accordance with the present invention, a pertinent binder, such as polyvinyl alcohol, dextrin, carboxymethyl cellulose, etc., can be used.

Various methods which are generally utilized for shaping of ceramics can be employed for shaping the raw material composition of the present invention. For instance, water is added to a raw material powder, for example, in an amount from 20 to 25% and kneaded, and then shaped by extrusion; or water is added to a raw material powder, for example, in an amount from 5 to 10% and blended, and then shaped under pressure. Needless to say, the said means are intended to show some embodiments but not to limit the scope of the present invention. It will be apparent to one skilled in the art that the shaped bodies of the present invention can be prepared by any other means and conditions than those illustrated as above.

The shaped body is thereafter dried and then fired. The drying temperature and time are not specifically essential in the present invention but can be determined merely in consideration of the fact that the water in the body can sufficiently be evaporated out.

The firing temperature is to be higher than 1200° C. and up to 1350° C. or lower. The time for maintaining the said firing temperature is recommended to be from 30 minutes to 20 hours or so. If the firing temperature exceeds 1350° C., $\alpha$-wollastonite would be formed and at the same time the resulting body would display a rapid melting property, and as a result, any practical product could not be obtained.

On the other hand, if the firing temperature is lower than 1200° C., the strength of the sintered body would be insufficient. A preferred firing temperature range is from 1230° C. to 1330° C., and especially from 1250° C. to 1300° C. When the firing temperature is selected from the said preferred range, the firing time is recommended to fall within the range from 40 minutes to 3 hours. Too short firing time would give an insufficient strength to the sintered body, while too long firing time would uselessly increase the consumption of heat energy for the firing.

As mentioned above, the raw material composition for use in the present invention contains a specific amount of MgO, and therefore, the transition into $\alpha$CaO.SiO$_2$ could be prevented even by firing at such high temperature, and a good crystal product of $\beta$CaO.SiO$_2$ ($\beta$-wollastonite) can be obtained. Accordingly, the sintered ceramic body of the present invention, as having a specifically defined composition of CaO, SiO$_2$ and MgO, has an excellent machinability because of the $\beta$CaO.SiO$_2$ crystal texture. In addition, because of the existence of MgO in the composition, the transition temperature from $\beta$CaO.SiO$_2$ to $\alpha$CaO.SiO$_2$ is elevated, and therefore, the said CaO-SiO$_2$-MgO composition of the present invention can be fired at a high temperature so that the sintered body manufactured by the present invention always has a high refractoriness and a high strength.

The following examples are intended to illustrate the present invention in more detail. It should be noted, however, that these are not whatsoever intended to limit the scope of the present invention in any way.

EXAMPLES 1 TO 8

The following raw materials were prepared.
(1) Wollastonite #350 (from Kitsurin Province, China), central grain size 12 μm.

(2) Wollastonite #5000 (from Kitsurin Province, China), central grain size 6 μm.
(3) Talc (manufactured by Sobue Clay Co., Ltd.), "PS".
(4) Nepheline Feldspar (manufactured by Inagaki Mining Co., Ltd.), "MINEX #3".
(5) Calcium Carbonate (special grade chemical)
(6) Fine Silica (manufactured by Tomita Pharmaceutical Co., Ltd.), central grain size 2 μm.

Next, the above-mentioned raw materials were blended in the proportion as shown in Table 2 below and mixed in an Eirich Mixer for 5 to 10 minutes. The chemical compositions of the resulting mixtures in the respective Examples are shown in Table 3 below.

Water was added to the mixture in an amount of from about 20 to about 25% (as weight ratio of water to the solid content of the mixture), and a PVA series binder W201 (manufactured by Sekisui Chemical Co., Ltd.) was added thereto in an amount of 2% (as weight ratio of 25% binder solution to the solid content of the mixture). After blended, the resulting mixture was shaped by vacuum extrusion shaping method. The shaped body thus formed had a size of 5 cm×20 cm×1 cm.

The shaped body was dried at 80° C. for 24 hours then fired. For the firing, the temperature was elevated from room temperature up to 300° C. at a rate of 10° C./min, and the firing system was maintained at 300° C. for 90 minutes; and then the temperature was again elevated up to 1250° C. at a rate of 10° C./min, and the firing was performed at 1250° C. for 60 minutes. Thus, the sintering of the body was completed Afterwards, the thus sintered body was spontaneously cooled in the electric furnace to room temperature.

The phase texture of the sintered body thus obtained was examined by X-ray diffraction method, and as a result, the body was confirmed to almost comprise β-wollastonite $\beta CaO \cdot SiO_2$) with a solid solution of MgO in every case, although containing traces of quartz ($SiO_2$), diopside ($CaMg(SiO_3)_2$) and pseudowollastonite ($\alpha CaO \cdot SiO_2$).

Table 4 shows the results obtained by measurement of the bending strength of the sintered body of the respective Examples, which indicate that all the sintered bodies obtained in Examples had a high bending strength.

Further, Table 4 also show the results obtained by measurement of the bulk density, water absorption percentage and machinability of all the sintered bodies. The water absorption percentage was calculated by dividing the weight of the water as absorbed by the dry sintered body, when the body was dipped in water for 24 hours, by the weight of the dry sintered body, and this was represented by the unit of (%).

The test method and the evaluation method for the machinability were as follows.

Test Method

Almost the same turning operation conditions (sintered carbide tools, feeding rate of 0.097 mm/rotation, cutting rate of 2 to 4 mm) as those indicated for a mica glass ceramic product "macor" in its manual were applied to the sintered bodies of the Examples, and the cutting rate (m/min) capable of machining the bodies with no cutting failure, such as chipping, etc., was determined in every case.

Evaluation Method

In the above-mentioned test, the body samples which were found to have a cutting rate of 2 to 3 times of "macor" (30 to 50 m/min) were evaluated to be "A", and those with a cutting rate of 3 times or more of "macor" were evaluated to be "AA".

All the bodies of the Examples 1 to 9 of the present invention were evaluated to be extremely superior to "macor" with respect to the machinability.

EXAMPLE 9

The same raw materials as those used in the above-mentioned Examples were blended in the proportion of No. 9 of Table 2. The chemical composition of the resulting mixture was shown in Table 3. To the mixture were added water in an amount of 5% (as weight ratio of water to the solid content of the mixture) and binder W201 in an amount of 1% (as weight ratio of 25% binder solution to the solid content of the mixture), and the whole was fully blended. The thus formed mixture was put in a shaping mold and shaped under compression of about 30 MPa to form a shaped body having a size of 11 cm×11 cm×5 cm. The body was sintered in the same manner as the above-mentioned Examples to obtain a sintered body. The characteristics of the sintered body are shown in Table 4, which indicate that the body is excellent in the machinability. The texture of the sintered body was confirmed to be the same as that of the bodies in the above-mentioned Examples by X-ray diffraction.

TABLE 2

| Example No. | Proportion of Raw Materials (parts by weight) | | | | | |
|---|---|---|---|---|---|---|
| | Wollastonite #350 | Wollastonite #5000 | Talc | Nepheline Feldspar | CaCO3 | SiO2 |
| 1 | 100 | | 10 | | | |
| 2 | 75 | | 25 | | | |
| 3 | 60 | | 40 | | | |
| 4 | 70 | | 20 | | | 10 |
| 5 | 56 | | 36 | | 8 | |
| 6 | 100 | | 10 | 5 | | |
| 7 | | 100 | 10 | 5 | | |
| 8 | 100 | | 10 | 10 | | |
| 9 | 100 | | 10 | | | |

TABLE 3

| | | | | Other Oxides (wt. %) | |
|---|---|---|---|---|---|
| Example No. | CaO | SiO2 | MgO | Al2O3 | K2O + Na2O |
| 1 | 44.5 | 52.4 | 3.1 | | |
| 2 | 36.7 | 54.8 | 8.5 | | |
| 3 | 29.4 | 57.0 | 13.6 | | |
| 4 | 34.3 | 58.9 | 6.8 | | |
| 5 | 35.0 | 53.0 | 12.0 | | |
| 6 | 42.6 | 52.7 | 3.0 | 1.0 | 0.7 |
| 7 | 42.6 | 52.7 | 3.0 | 1.0 | 0.7 |
| 8 | 40.9 | 53.0 | 2.9 | 1.9 | 1.3 |
| 9 | 44.5 | 52.4 | 3.1 | | |

TABLE 4

| Example No. | Bending Strength (MPa) | Bulk Density (g/m³) | Water Absorption (%) | Machinability | Phase Texture (*) |
|---|---|---|---|---|---|
| 1 | 57 | 2.02 | 12.5 | AA | β  D |
| 2 | 50 | 2.02 | 12.4 | AA | β> D > α |
| 3 | 32 | 1.80 | 19.3 | AA | β> D > α |
| 4 | 52 | 2.00 | 1.26 | AA | β> D, C > α |
| 5 | 26 | 1.75 | 20.5 | AA | β> D |
| 6 | 60 | 2.05 | 10.5 | A | β  D, α |
| 7 | 62 | 2.06 | 10.9 | A | β  D, α |
| 8 | 77 | 2.25 | 5.5 | A | β  D, α |
| 9 | 31 | 2.01 | 13.0 | AA | β  D |

(*) β: β-CS, α: α-CS, D: Diopside C: Cristobalite

EXPERIMENTAL EXAMPLE

The sintered body of Example 1 was subjected to bending test at a high temperature. Specifically, the sintered body of Example 2 was heated up to a determined temperature at a heating rate of 10° C./min and then kept at the determined temperature for 30 min. Afterwards, the strength of the thus heated body was measured. The results obtained are shown in Table 5 below, which demonstrate that the sintered body can be heated up to a generally employed temperature of 1100° C.

TABLE 5

| Temperature | Before Heated | 800° C. | 1000° C. | 1100° C. | 1200° C. |
|---|---|---|---|---|---|
| Bending Strength (MPa) | 50 | 48 | 51 | 49 | 21 |

The characteristic feature of keeping the strength before heating even after heated at a temperature of up to 1100° C. was also seen in the sintered bodies of Examples 1 to 5 Example 9. (This is because no flux component was added to the bodies of these Examples 1 to 5 and Example 9.) In the sintered bodies of Examples 6 to 8, since the nepheline feldspar which is a flux component softens at about 1050° C. or higher, the employable temperature for the sintered bodies was 1000° C.

From the above results, it is apparent that the sintered bodies of the present invention have an extremely high refractoriness.

What is claimed is:

1. A sintered ceramic body, consisting essentially of a composition of CaO–SiO$_2$–MgO wherein the weight % of each component falls within the polygon described in FIG. 1 and up to 10% by weight feldspar based on the amount of wollastonite formed on firing, said composition being fired at a temperature between 1,200° C. and 1,350° C. and mainly containing beta-wollastonite so that the sintered ceramic body has high strength, excellent refractoriness and machinability.

2. A sintered ceramic body as claimed in claim 1, in which the β-wollastonite contains a solid solution of MgO.

3. A sintered ceramic body as claimed in claim 11, in which said composition is formed from at least one member selected from the group consisting of wollastonite, xonotlite, and calcium carbonate and silica; and at least one member selected from the group consisting of talc, dolomite, magnesium hydroxide, magnesium carbonate and magnesium oxide.

4. A method of manufacturing a sintered ceramic body with high strength, excellent refractoriness and machinability, comprising:
preparing a raw material composition consisting essentially of CAO, SiO$_2$ and MgO wherein the weight % of each component falls within the polygon described in FIG. 1 and up to 10% by weight feldspar based on the amount of wollastonite formed on firing,
shaping the raw material composition, and
firing the shaped composition at a temperature between 1,200° C. and 1,350° C. so that the ceramic body mainly contains beta-wollastonite.

5. A method of manufacturing a sintered ceramic body as claimed in claim 4, in which said raw material composition is formed from at least one member selected from the group consisting of wollastonite, xonotlite, and calcium carbonate and silica; and at least one member selected from the group consisting of talc, dolomite, magnesium hydroxide, magnesium carbonate and magnesium oxide.

6. A method of manufacturing a sintered ceramic body as claimed in claim 5, in which an amount of the feldspar to be added is more than 0 and less than 10% by weight of the amount of wollastonite.

7. A method of manufacturing a sintered ceramic body as claimed in claim 4, in which an amount of the feldspar to be added is more than 0 and less than 10% by weight of the amount of wollastonite.

* * * * *